US005251092A

United States Patent [19]

Brady et al.

[11] Patent Number: 5,251,092

[45] Date of Patent: Oct. 5, 1993

[54] RECEPTACLE ASSEMBLY WITH BOTH INSULATION DISPLACEMENT CONNECTOR BUSSING AND FRICTION CONNECTOR COUPLING OF POWER CONDUCTORS TO SURGE SUPPRESSOR CIRCUIT

[75] Inventors: Peter J. Brady, Glendale; Carol Miller, Mesa; David R. Powell, Phoenix, all of Ariz.

[73] Assignee: Protek Devices, LP, Tempe, Ariz.

[21] Appl. No.: 800,629

[22] Filed: Nov. 27, 1991

[51] Int. Cl.[5] .......... H02H 9/04

[52] U.S. Cl. .......... 361/56; 361/111; 361/126

[58] Field of Search .......... 361/56, 111, 91, 126, 361/127

[56] References Cited

U.S. PATENT DOCUMENTS

| | | | |
|---|---|---|---|
| 4,922,374 | 5/1990 | Mueller et al. | 361/111 |
| 5,119,266 | 6/1992 | Petry | 361/111 |
| 5,142,430 | 8/1992 | Anthony | 361/111 |

*Primary Examiner*—Todd E. DeBoer

*Attorney, Agent, or Firm*—Cahill, Sutton & Thomas

[57] ABSTRACT

A power receptacle assembly includes a plurality of AC snap receptacles each having a base containing three insulation displacement connectors and each electrically connected to a female receptacle connector element. A snap-on retainer forces three insulated power conductors into the three insulation displacement connectors causing knife blade edges thereof to displace insulation and electrically connect inner conductor elements of the insulated power conductors. The snap-on retainer of one of the AC snap receptacles also receives three slotted male tab friction fit connectors to electrically connect them to the three power conductors, respectively. The three slotted male tab friction fit connectors are connected to a printed circuit board that interacts with the three power conductors. Each slotted male tab friction fit connector has an elongated slot separating two bifurcated prongs, outer edges of the prongs frictionally engaging inner surfaces of the insulation displacement connectors. Each insulated power conductors extends through one of the elongated slots.

11 Claims, 2 Drawing Sheets

RECEPTACLE ASSEMBLY WITH BOTH INSULATION DISPLACEMENT CONNECTOR BUSSING AND FRICTION CONNECTOR COUPLING OF POWER CONDUCTORS TO SURGE SUPPRESSOR CIRCUIT

BACKGROUND OF THE INVENTION

The invention relates to assemblies including multiple "AC snap receptacles" connected to ordinary AC power conductors and also to printed circuit boards carrying transient surge suppressor circuitry, filter circuitry, or other circuitry.

So-called "power strips" including a plurality of power receptacles and also including pulse suppressor circuits are widely used to protect sensitive electrical equipment such as computers, microwave ovens, television sets, and stereo circuitry from damage due to lightning-induced voltage surges and power surges on the AC power lines. Such power strips contain a power cord that plugs into an ordinary household AC power outlet, and the sensitive equipment is plugged into the various AC power outlets or receptacles of the power strip. The market for such power strips is highly competitive. Most power strips are manufactured outside of the United States in countries with low labor costs because manufacture of present power strips requires a large amount of human labor. Those skilled in the art of engineering improvements for power strip products and the like usually attempt to reduce the cost of manufacture by reducing the amount of human labor required, to avoid the substantial inconvenience associated with overseas manufacture of a product marketed in the U.S.

Power strips and like products frequently use plastic AC snap receptacles marketed under the trademark "AMP". An exploded view of such AC snap receptacle 10 is shown in FIG. 1A. Snap receptacle 10 includes a rectangular housing 10A and a separate snap-on retainer 10B. The bottom surface (not shown) of housing 10A contains three slots for receiving the two "hot" prongs and the ground prong of a typical three wire male plug connector of an appliance or other power utilization device. The three female connector elements for receiving the two "hot" prongs and the ground prong are attached to integral plastic support members inside body 10. Each female connector element is integral with two upwardly extending insulation displacement/-connector prongs 12. Each insulation displacement/-connector prong 12 has a "knife blade" edge defining an elongated slot, so that when an insulated conductor 11 is forced downward into the slot as shown in FIG. 1A, the knife edges cut through the insulation and contact the inner copper conductor of the wire 11. Each insulation displacement/connector prong 12 also forms a U-shaped contact channel along which the outer edge of a male tab friction fit connector can slide during insertion. Normally, the AC snap receptacle housing 10 is "snapped" into a rectangular opening in a mounting panel, and is retained in place by latching elements 13.

Snap-on retainer 10B includes four hooked legs 15, the hook ends of which resiliently yield to allow snap-on retainer 10B to be forced onto the assembly shown in the lower portion of FIG. 1A. The hooked ends of legs 15 snap into grooves 16 on either side of the housing 13 when snap-on retainer 10B is fully inserted and locked in place. Three connector-receiving slots 14 are provided in the upper surface of snap-on retainer 10B to receive three male tab friction fit connectors 21 that are connected to wires 20 or to a printed circuit board. The two modes of connecting electrical power to snap receptacle 10 shown in FIGS. 1A and 1B are mutually exclusive, because the lower ends of the male tab friction fit connectors 21 abut the upper insulated surfaces of wires 11, so the outer edges of male tab friction fit connectors 21 cannot slide between and frictionally fit into the two opposed U-shaped channels of the insulation displacement/connector prongs 12.

FIG. 2 shows an exploded side view diagram of the closest prior art, presently marketed by the assignee. The assembly 17 shown in FIG. 2 is a power strip having a mounting panel 24 into which a suitable number of AC snap receptacles 10 of the type shown in FIGS. 1A and 1B are mounted. An on/off switch 25 having three upwardly extending conductive prongs also is mounted in panel 24. A printed circuit board 30 containing a transient voltage suppressor circuit including a number of large capacitors 26, a number of metal oxide varistors 27, several large inductors 27, and a number of Transorb semiconductor junction pulse suppressor diodes 28 are interconnected to perform a suitable transient voltage suppression function. (For convenience, the housing covering printed circuit board 30 is omitted in FIG. 2.) The insulated conductors 11 coming from the receptacles 10 installed in the mounting panel 24 are connected to the copper conductors 11A by solder connections to suitable metalization strips on the upper and lower surfaces of printed circuit board 30. Each of the three power conductors 11 is connected in parallel with a plurality of snap receptacles 10 in the manner shown in FIG. 1A.

Due to the fact that one of the large capacitors 26 extends downward so as to block routing of power conductors 11, the two left AC snap receptacles 10-1 and 10-2 are not directly connected to power conductors 11. Instead, the connection shown in FIG. 1B is utilized for each of receptacles 10-1 and 10-2, with male tab friction fit connectors such as 21 inserted into connector-receiving slots 14 in the upper surfaces of their snap-on retainers 10B. The upwardly extending conductive prongs of on/off switch 25 also are inserted in corresponding female connectors 25A to effectuate mounting of printed circuit board 30 on mounting panel 24.

The stripped ends 11A of power conductors 11 extend through three holes 31 in printed circuit board 30, as shown in FIG. 2A, which is an enlarged view of detail 2A in FIG. 2. A considerable amount of manual assembly effort is required to effectuate bending of the stripped ends 11A of power conductors 11 upward and insertion of them through holes 31. Since most of the printed circuit board has already been efficiently soldered by means of a wave soldering machine, the areas to be soldered around holes 31 must be masked against solder flow by hand. The labor intensive operation of applying suitable amounts of solder masking material exposing only the areas to which the stripped ends 11A of the power conductors are to be soldered must be performed. The soldering is performed after printed circuit board 30 has been mounted as described above, and after the soldering operation the solder masking material must be removed.

It would be desirable to simplify the manufacture of products using power receptacles of the type described above.

SUMMARY OF THE INVENTION

Accordingly, it is an object of the invention to provide simplified design of products using female power receptacles connected to circuitry that interacts with conductors supplying power to the receptacles.

It is another object of the invention to provide a simplified transient-protected AC power receptacle device.

It is another object of the invention to reduce the amount of human labor required in manufacture of a device including a plurality of female power outlets connected to circuitry that interacts with the conductors supplying power to the female power outlets.

It is another object of the invention to increase the reliability of such products.

It is another object of the invention to reduce cost of manufacturing power strips including circuits coupled to conductors supplying power to female power outlets thereof.

It is another object of the invention to provide a structure for making simultaneously electrical connection to insulation displacement connectors and friction fit connectors of female power receptacles with both insulated power conductors and male tab friction fit connectors.

Briefly described, and in accordance with one embodiment thereof, the invention provides a power receptacle assembly including a female power receptacle having a base containing three insulation displacement connectors each electrically connected to a female receptacle connector element, and a snap-on retainer forcing three insulated wires each having an inner power conductor into the three insulation displacement connectors, respectively, and also receiving three slotted male tab friction fit connectors to electrically connect them to the female receptacle connector elements, respectively. The three insulated wires are pressed into electrical connection with knife blade edges of the three insulation displacement connectors, respectively, by the snap-on retainer. The three slotted male tab friction fit connectors are connected to a circuit that interacts with the power conductors. Each slotted male tab friction fit connector has an elongated slot separating two bifurcated prongs, outer edges of the prongs frictionally engaging inner contact surfaces of the insulation displacement connectors, respectively. The three insulated wires extend through the elongated slots, respectively. In one embodiment, the power receptacle assembly includes a plurality of AC snap receptacles. The three insulated wires extend into each of the AC snap receptacles and electrically contact the three insulation displacement elements of each AC snap receptacle. The circuit is formed on a printed circuit board. The three slotted male tab friction fit connectors are rigidly soldered to a surface of the printed circuit board. The circuit includes a transient surge suppressor circuit that suppresses externally induced AC power line transient voltages. The transient surge suppressor circuit includes capacitors, inductors, metal oxide varistors, and surge suppressor semiconductor devices interconnected to form the surge suppression circuit, a power on/off switch connecting the three power conductors to a power cord, and a circuit breaker coupled in series with one of the incoming AC power conductors. The AC snap receptacles and the on/off switch are mounted on a panel. A housing enclosing the printed circuit board and the AC snap receptacles can be attached to the panel.

DETAILED DESCRIPTION OF THE PREFERRED EMBODIMENTS

Figure 3:
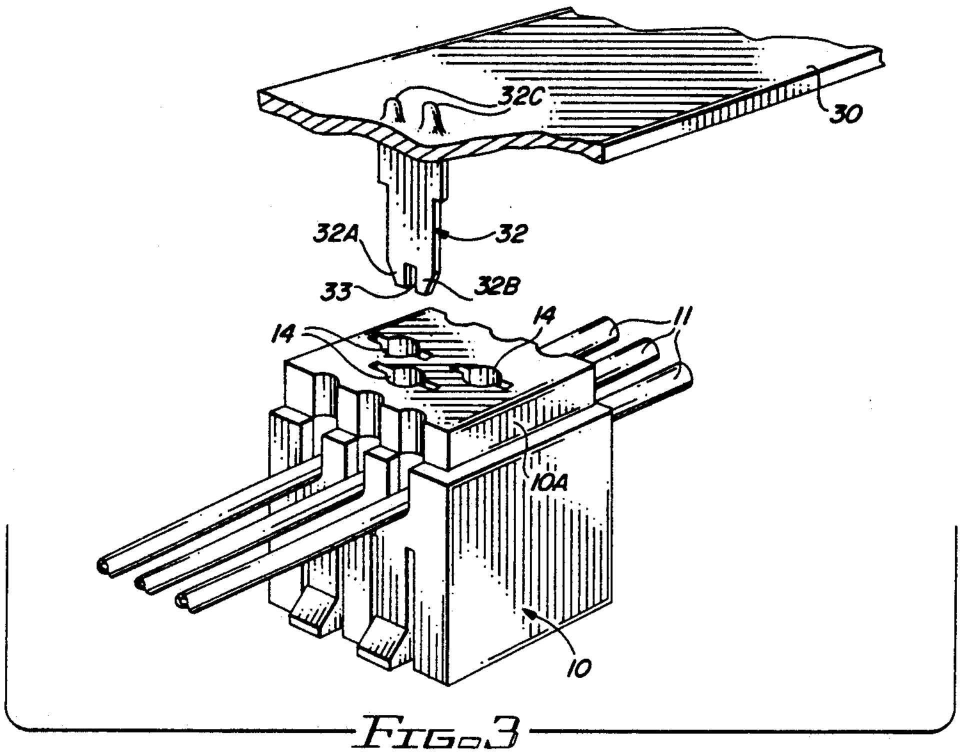
FIG. 3 is a perspective view illustrating electrical connection to an AC snap receptacle in accordance with the invention both by means of male tab friction fit connectors and insulation displacement connectors.

Referring now to FIG. 3, slotted male tab friction fit connector 32 has two lower bifurcated prongs 32A and 32B separated by a slot 33. The distance between the opposed vertical edges of slotted male tab friction fit connector 32 is 0.205 inches, the same as for the unslotted male tab friction fit connectors 21 previously described. A second pair of bifurcated prongs 32C attached to the top end of slotted male tab friction fit connector 32 extend upward through a pair of spaced holes in printed circuit board 30 and are soldered to a metalization strip surrounding the holes on a surface of printed circuit board 30. These solder connections are made during the same wave soldering operation used to make the other solder connections associated with circuitry formed on printed circuit board 30.

The width and depth of slot 33 is sufficiently large to allow an insulated power conductor 11 to pass through it, enabling the opposed side edges of slotted male tab friction fit connector 32 to slide down along the opposed U-shaped channel surfaces of the insulation displacement/connector prongs 12.

Although not shown in FIG. 3, three soldered-on slotted male tab friction fit connectors 32 actually extend downward from the lower surface of printed circuit board 30, aligned with the three slots 14 in snap-on retainer 10B. Thus, strip conductors and circuitry on printed circuit board 30 can be connected to the three power conductors 11. The circuitry therefore can be electrically interactive with the power conductors, all of the AC snap receptacles 10, and any utilization devices plugged into them.

Figure 2A:
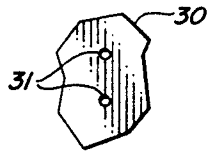
FIG. 2A is an enlarged view of detail 2A of FIG. 2.
Figure 2:
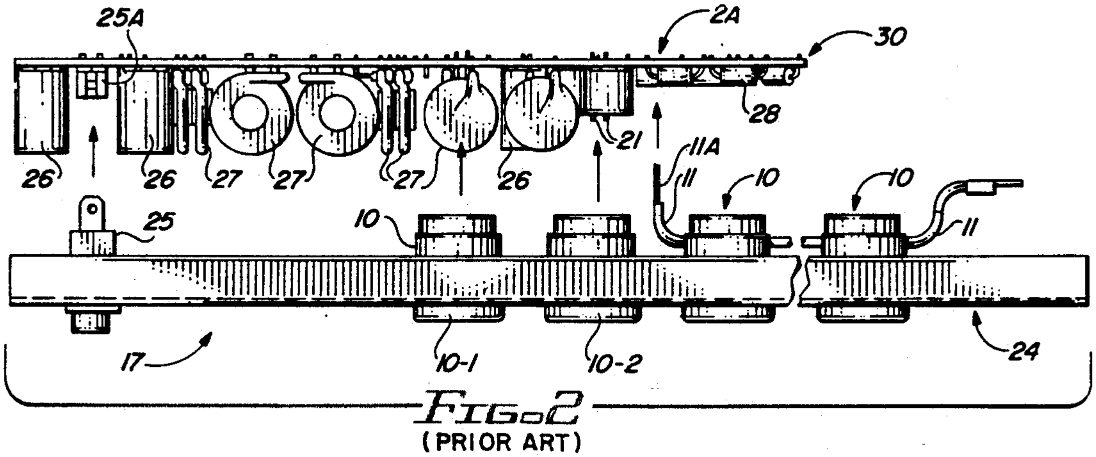
FIG. 2 (PRIOR ART)
FIG. 2 is an exploded side view of a prior art transient overvoltage-protected power strip.
Figure 4:
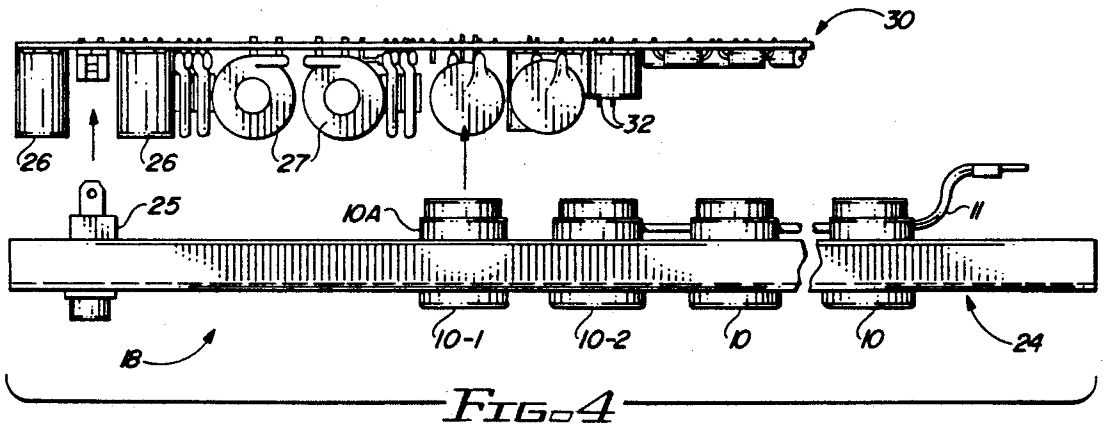
FIG. 4 is an exploded side view of a transient-overvoltage-protected power strip according to the present invention.

Referring to FIG. 4, overvoltage protected power strip 18 is similar in many respects to the overvoltage protected power strip 17 in FIG. 2, and the same reference numerals have been used in FIG. 4 to designate similar or identical components. In FIG. 4, however, most of the AC snap receptacles 10 (preferably all of them) are "bussed" together in parallel connection by straight, rigid power conductors 11. Underwriters Laboratory requires that the power conductors 11 include a rigid 14 gauge copper wire conductor before UL certification is granted.

The left ends of power conductors 11 do not extend beyond AC snap receptacle 10-2, and no bending of the left ends of such power conductors is required, in contrast to the prior art of FIG. 2. Instead, three slotted male tab friction fit connectors 32 are flow soldered to metal strips on circuit board 30 which carry a neutral voltage and two AC conductor voltages constituting ordinary household electrical power voltages (typically 120 volts AC) on the top and/or bottom surfaces of printed circuit board 30. If the presence of large circuit components on the bottom surface of printed circuit board 30 makes it impossible to extend power conductors 11 to one of the AC snap receptacles, such as receptacle 10-1, then that AC snap receptacle may be electrically connected to power conductors 11 by means of male tab friction fit connectors such as 21 shown in FIG. 2, although preferably this situation is avoided. Electrical connection of the three power conductors 11 to the terminals of switch 25 can be accomplished by means of separate conductors with end friction tab connectors rather than by soldering as in FIG. 2.

Figure 1A:
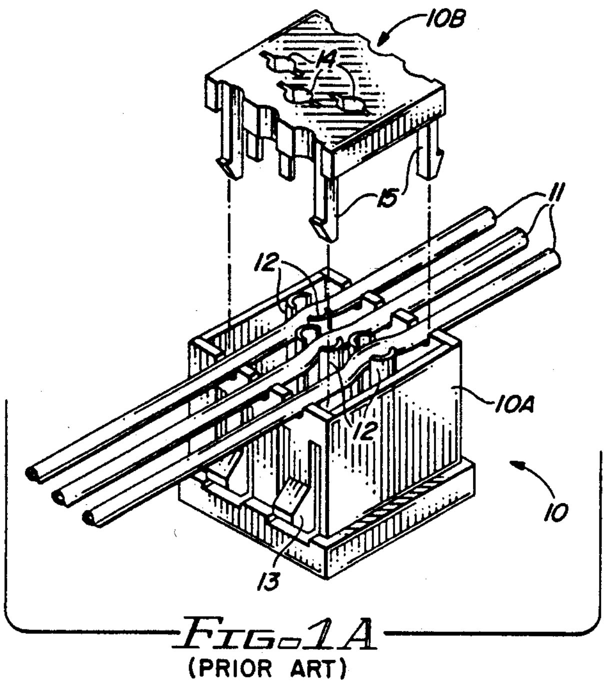
FIG. 1A (PRIOR ART)
FIG. 1A is an exploded view of a prior art AC snap receptacle showing connection to power conductors using insulation displacement connectors.
Figure 1B:
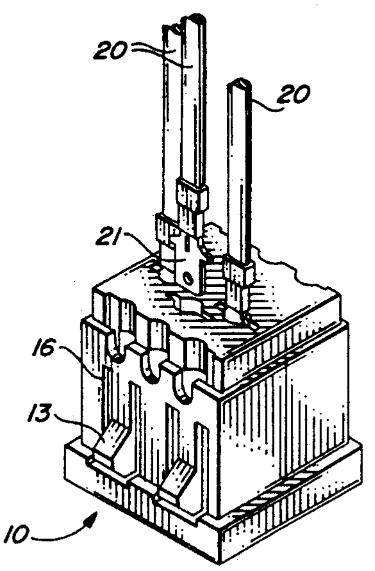
FIG. 1B (PRIOR ART)
FIG. 1B is a perspective view of the AC snap receptacle of FIG. 1A illustrating electrical connection thereto by means of male tab friction fit connectors.

The technique described above allows very convenient connection of power conductors 11 to the AC snap receptacles 10, because power conductors 11 can simply be laid between the various insulation displacement/connector prongs 12 as shown in FIG. 1A, and the various snap-on retainers 10B can be pressed into place at once by means of a suitable press. The amount of human labor required for the manufacture of the power strip 18 is therefore substantially less than is the case for the embodiment of FIG. 2.

Thus, the objective is met of being able to assemble the fully loaded printed circuit board 30 onto the mounting panel 24 by simply press fitting the two together so that the switch connectors and the male tab friction fit connectors mate, despite the fact that all or nearly all of the snap receptacles are also bussed together by means of insulation displacement connectors.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the described technique may be useful when the circuitry on a printed circuit board includes noise suppression circuitry for suppressing noise produced by devices such as electrical shavers that are plugged into the various AC snap receptacles of the power strip. Also, various groups of snap receptacles can be bussed together in parallel, but isolated from each other by suitable isolation circuitry. This expedient may be desirable when one of the receptacles is used to power a device such as a printer or electrical shaver that generates a great deal of electrical noise. Also, the technique of the present invention may be useful if the circuitry associated with the power conductors is utilized to control them in response to remote signals.

What is claimed is:

1. A power receptacle assembly comprising in combination:
   (a) an AC snap receptacle including a base containing three insulation displacement connectors each electrically connected to a separate female receptacle connector element and each having a knife edge slot, the AC snap receptacle also including a snap-on retainer, the snap-on retainer having three connector-receiving slots;
   (b) three insulated wires, each having an inner power conductor, pressed by the snap-on retainer into the three knife edge slots, respectively, causing knife edges of the knife edge slots to displace insulation of the three insulated wires and electrically contact the three power conductors, respectively; and
   (c) three slotted male tab friction fit connectors connected to a circuit that interacts with the three power conductors, each slotted male tab friction fit connector having an elongated slot separating two bifurcated prongs, outer edges of each pair of prongs frictionally engaging a pair of inner contact surfaces of a separate insulation displacement/connector, respectively, the three insulated wires extending through the elongated slots, respectively.

2. The power receptacle assembly of claim 1 including a plurality of the AC snap receptacles, the three insulated wires extending into each of the AC snap receptacles and electrically contacting the three insulation displacement connectors of each AC snap receptacle, the power receptacle assembly further including a printed circuit board carrying the circuit, the three slotted male tab friction fit connectors being rigidly soldered to corresponding strip conductors on the printed circuit board.

3. The power receptacle assembly of claim 2 wherein the circuit includes a transient surge suppressor circuit that suppresses externally induced AC power line transient voltages between the power conductors.

4. The power receptacle assembly of claim 1 wherein the circuit includes a control circuit controlling flow of power to the AC snap receptacle.

5. The power receptacle assembly of claim 2 wherein the circuit includes a noise suppression circuit that suppresses noise generated on the power conductors by a utilization device plugged into an AC snap receptacle of the power receptacle assembly.

6. The power receptacle assembly of claim 3 wherein the transient surge suppressor circuit includes capacitors, inductors, metal oxide varistors, and surge suppressor semiconductor devices interconnected to form the surge suppression circuit.

7. The power receptacle assembly of claim 6 further including a power on/off switch connecting the three power conductors to a power cord and also includes a circuit breaker coupled in series with one of the power conductors.

8. The power receptacle assembly of claim 7 wherein the plurality of AC snap receptacles are mounted on a panel and the on/off switch is mounted on the panel and a housing enclosing the printed circuit board and bodies of the AC snap receptacles is attached to the panel.

9. The power receptacle assembly of claim 2 wherein the three insulated wires are rigid, each including only a single rigid center conductor surrounded by soft PVC insulation material.

10. A method of making a power receptacle assembly, comprising the steps of:
    (a) attaching three slotted male tab friction fit connectors to a printed circuit board having thereon a circuit that interacts with three insulated power conductors, each slotted male tab friction fit connector having a slot separating two bifurcated prongs;
    (b) mechanically and electrically connecting the three power conductors to a plurality of female power receptacles by placing the power conductors on three insulation displacement connectors, respectively, of the female power receptacle and pressing them into knife edge slots of the insulation displacement connectors by means of a snap-on retainer so that knife edges of the three insulation displacement connectors displace insulation of and electrically contact the three power conductors, respectively; and (c) mechanically and electrically connecting the printed circuit board to the three power conductors by inserting the three slotted male tab friction fit connectors into connector-receiving slots of the snap-on retainer so that outer edges of the prongs frictionally contact inner contact surfaces of the three insulation displacement connectors and the three power conductors pass through the slots of the three slotted male tab friction fit connectors.

11. A power receptacle assembly comprising in combination:

(a) a female receptacle including a base containing three insulation displacement connectors each electrically connected to a separate female receptacle connector element, and each having a knife edge slot, the female receptacle also including a snap-on retainer, the snap-on retainer having three connector-receiving slots;

(b) three insulated wires, each having an inner power conductor, pressed by the snap-on retainer into the three knife edge slots, respectively, causing knife edges of the knife edge slots to displace insulation of the three insulated wires and contact the three power conductors, respectively; and (c) three slotted male tab friction fit connectors connected to a circuit that interacts with the three power conductors, each slotted male tab friction fit connector having an elongated slot separating two bifurcated prongs, outer edges of each pair of prongs frictionally engaging a pair of inner contact surfaces of a separate insulation displacement connector, respectively, the three insulated wires extending through the elongated slots, respectively.

* * * * *